(12) United States Patent
Ono et al.

(10) Patent No.: US 11,738,814 B2
(45) Date of Patent: Aug. 29, 2023

(54) WORK VEHICLE

(71) Applicant: Kubota Corporation, Osaka (JP)

(72) Inventors: Toshiki Ono, Sakai (JP); Hiroki Bessho, Sakai (JP); Yuichiro Kimura, Sakai (JP); Rei Tokuda, Sakai (JP)

(73) Assignee: Kubota Corporation, Osaka (JP)

( * ) Notice: Subject to any disclaimer, the term of this patent is extended or adjusted under 35 U.S.C. 154(b) by 1168 days.

(21) Appl. No.: 16/190,274

(22) Filed: Nov. 14, 2018

(65) Prior Publication Data

US 2019/0276103 A1    Sep. 12, 2019

(30) Foreign Application Priority Data

Mar. 8, 2018 (JP) .................. 2018-042053

(51) Int. Cl.

| | |
|---|---|
| B62D 63/04 | (2006.01) |
| B60P 1/04 | (2006.01) |
| F01N 13/14 | (2010.01) |
| F01N 13/18 | (2010.01) |
| B62D 21/18 | (2006.01) |
| F16F 1/373 | (2006.01) |

(52) U.S. Cl.
CPC ............. B62D 63/04 (2013.01); B60P 1/04 (2013.01); B62D 21/18 (2013.01); F01N 13/14 (2013.01); F01N 13/1822 (2013.01); F16F 1/3732 (2013.01)

(58) Field of Classification Search
CPC ........ B62D 63/04; B62D 21/18; B62D 33/02; B62D 23/005; B60P 1/04; F01N 13/14; F01N 13/1822; F01N 13/1811; F01N 2260/20; F01N 2590/08; F16F 1/3732
See application file for complete search history.

(56) References Cited

U.S. PATENT DOCUMENTS

| | | | | |
|---|---|---|---|---|
| 5,961,266 | A * | 10/1999 | Tseng ...................... | F16B 37/12 411/289 |
| 2006/0042871 | A1* | 3/2006 | Yasuda ............... | F01N 13/1838 181/227 |
| 2007/0294972 | A1* | 12/2007 | Ducharme ............ | G10K 11/16 52/351 |
| 2013/0048406 | A1 | 2/2013 | Kuramoto | |
| 2015/0300233 | A1* | 10/2015 | Bowers ................. | F01N 13/008 60/320 |
| 2016/0090889 | A1* | 3/2016 | Mahira ................. | B60K 13/04 180/309 |
| 2017/0001508 | A1* | 1/2017 | Bessho ..................... | F16H 9/12 |

(Continued)

FOREIGN PATENT DOCUMENTS

| | | |
|---|---|---|
| JP | 532279 U | 4/1993 |
| JP | 201343481 A | 3/2013 |
| JP | 201713690 A | 1/2017 |

*Primary Examiner* — Drew J Brown
(74) *Attorney, Agent, or Firm* — THE WEBB LAW FIRM (57) ABSTRACT

Disclosed is a work vehicle having a load carrier deck provided at a rear portion of a vehicle body to be vertically pivotable between an elevated discharging posture and a lowered load carrying posture. An engine section is provided under the load carrier deck. The engine section includes an engine, an exhaust muffler for the engine, and a muffler heat insulating cover for covering an outer circumference of the exhaust muffler. The muffler heat insulating cover is supported by a vehicle body frame via an anti-vibration member.

10 Claims, 6 Drawing Sheets

(56) References Cited

U.S. PATENT DOCUMENTS

2017/0001549 A1* 1/2017 Bessho .................. B60L 53/80
2017/0122180 A1* 5/2017 Lee ........................ F01N 13/14
2017/0322550 A1* 11/2017 Yokoyama ............ A01B 63/111
2019/0276103 A1* 9/2019 Ono ...................... B62D 63/04

* cited by examiner

WORK VEHICLE

CROSS REFERENCE TO RELATED APPLICATION

This application claims priority to Japanese Patent Application No. 2018-042053, filed Mar. 8, 2018, the disclosure of which is hereby incorporated in its entirety by reference.

BACKGROUND OF THE INVENTION

1. Field of the Invention

The present invention relates to a work vehicle.

2. Description of Related Art

A known work vehicle comprises a load carrier deck at a rear portion of a vehicle body to be vertically pivotable between an elevated discharging posture and a lowered load carrying posture, and an engine section under the load carrier deck, including an engine and an engine muffler (see. e.g. JP 2013-043481A or US 2013/0048406 A1 corresponding thereto). In such a work vehicle, a heat insulating cover, which covers the muffler, serves to suppress influence of heat discharged from the muffler to be applied to the load carrier deck. The cover serves also to prevent exposure of the muffler when the load carrier deck is elevated to the elevated discharging posture and thus the upper side of the engine section is exposed.

In general, an exhaust muffler and an engine are interconnected via a connection pipe, so that the exhaust muffler tends to be vibrated with significant amplitude due to engine vibration or the like. Thus, when a heat insulating cover is attached to the exhaust muffler, premature loosening tends to occur in the attachment of the heat insulating cover. Therefore, there is a need for a work vehicle capable of firmly supporting a heat insulating cover for an extended period of time.

SUMMARY OF THE INVENTION

In view thereof, a work vehicle with an arrangement as below is proposed:

A work vehicle comprising:

a vehicle body having a vehicle body frame;

a load carrier deck provided at a rear portion of the vehicle body, the load carrier deck being vertically pivotable between an elevated discharging posture and a lowered load carrying posture;

an engine section provided under the load carrier deck, the engine section including an engine and an exhaust muffler for the engine;

a muffler heat insulating cover that covers an outer circumference of the exhaust muffler; and an anti-vibration member provided in a region of the muffler heat insulating cover adjacent the vehicle body frame, the muffler heat insulting cover being supported by the vehicle body frame via the anti-vibration member.

With this arrangement, the heat insulating cover is supported by a vehicle body frame having a smaller amplitude of vibration compared with the exhaust muffler. Moreover, vibration transmission from the vehicle body frame to the exhaust muffler is lessened by the anti-vibration member. Thus, the heat insulating cover is supported with less possibility of vibration, compared with the arrangement of the cover being supported by the exhaust muffler.

Therefore, in the arrangement where the exhaust muffler is covered by a heat insulating cover, the heat insulating cover can be supported in a reliable manner without looseness for a long period of time.

In one preferred embodiment, the vehicle body frame includes a pair of right and left front/rear oriented vehicle body frames extending in a front/rear direction of the vehicle body; the exhaust muffler is provided on more vehicle body inner side than the front/rear oriented vehicle body frames; and the muffler heat insulating cover includes: an upper cover portion that covers the exhaust muffler from above, and a lateral cover portion that covers the exhaust muffler from the side opposite the front/rear oriented vehicle body frames relative to the exhaust muffler.

With this arrangement, the exhaust muffler is supported by the front/rear oriented vehicle body frames from the lateral outer side of the vehicle body. Whereby, the shape of the heat insulating cover can be a simple shape with an upper cover portion, and a lateral cover portion disposed opposite the front/rear oriented vehicle body frames relative to the exhaust muffler. Thus, the heat insulating cover can be obtained inexpensively.

In another preferred embodiment, the vehicle body frame includes a pair of right and left front/rear oriented vehicle body frames extending in a front/rear direction of the vehicle body, and a laterally oriented vehicle body frame that interconnects the pair of right and left front/rear oriented vehicle body frames; one end side of the muffler heat insulating cover is supported by one of the front/rear oriented vehicle body frames associated therewith; and the other end side of the muffler heat insulting cover is supported by the laterally oriented vehicle body frame via the anti-vibration member.

With this arrangement, even when there occurs a change in the relative position between a supporting portion for the heat insulating cover in the front/rear oriented vehicle body frames and a supporting portion for the heat insulating cover in the laterally oriented vehicle body frame, due to a manufacture error or deformation of the vehicle body frame, such change can be absorbed by deformation of the anti-vibration member. Thus, even in the presence of manufacture error or deformation in the vehicle body frame, the heat insulating cover can be assembled with no or less stress being applied to the heat insulating cover.

Further and other features and advantages resulting therefrom will become apparent upon reading the following detailed description.

In another preferred embodiment, for example, an arm member extends from the muffler heat insulating cover to the vehicle body frame; and as the anti-vibration member is engaged with the arm member, the arm member and the anti-vibration member are fastened and connected to the vehicle body frame together.

In still another preferred embodiment, the work vehicle further comprises: a connection pipe that interconnecting an exhaust section of the engine and the muffler; and a connection pipe heat insulating cover disposed aside the muffler heat insulating member for covering an outer circumference of the connection pipe.

DETAILED DESCRIPTION OF PREFERRED EMBODIMENTS

One embodiment of a work vehicle will be described next with reference to the drawings. In the instant embodiment, the work vehicle is embodied as a utility vehicle (a multi-purpose vehicle).

[General Configuration of Utility Vehicle]

Figure 1:
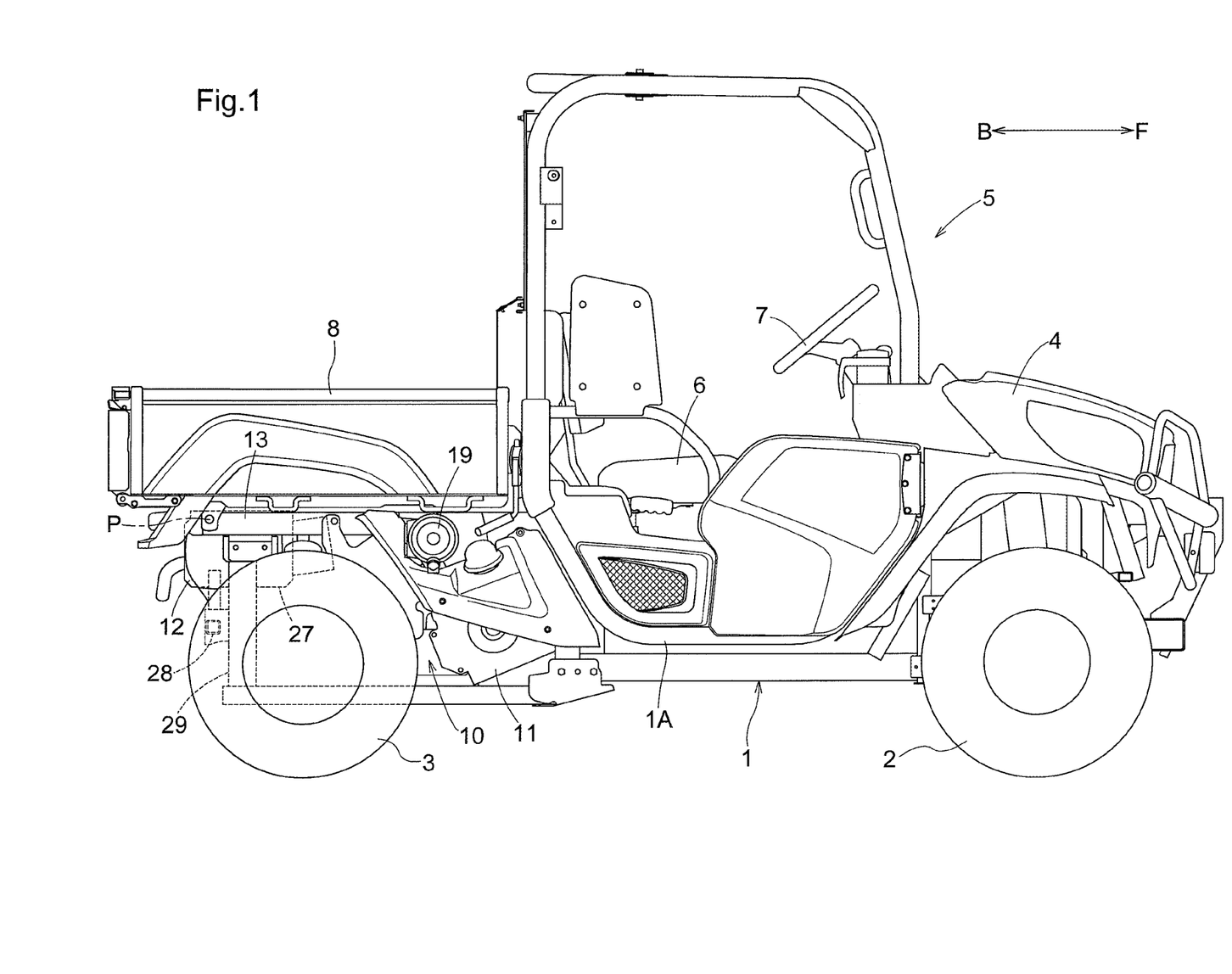
FIG. 1 is a right side view showing a utility vehicle in its entirety as one example of a work vehicle.

In the following description, in regards to a vehicle body 1 of the utility vehicle, the direction of an arrow F shown in FIG. 1 is defined as "vehicle boy front side", the direction of an arrow B is defined as "vehicle body rear side", the direction on the front side of the illustration is defined as "vehicle body right side" and the direction on the back side of the illustration is defined as "vehicle body left side", respectively.

As shown in FIG. 1, the utility vehicle includes: the vehicle body 1 having a vehicle body frame (vehicle body framework) 1A assembled in combination of pipe frames, etc.; a pair of right and left front wheels 2 attached to front portions of the vehicle body 1 to be steerable and drivable; and a pair of right and left rear wheels 3 attached to rear portions of the vehicle body 1 to be drivable. A front lid (front hood) 4 is provided at a front portion of the vehicle body 1 for covering from above the front portion of the vehicle body frame 1A and so on. A driving section 5 is formed between the front wheels 2 and the rear wheels 3. In the driving section 5, there are provided a driver's seat 6 and a steering wheel 7 for steering the front wheels 2. A load carrier deck 8 is provided at a rear portion of the vehicle body 1. The load carrier deck 8 is supported by the vehicle body frame 1A to be pivotable about an axis P, extending in a vehicle body width direction of a support shaft that is attached to a rear portion of the load carrier deck 8, between an elevated discharging posture in which a front end side of the deck is elevated relative to the vehicle body 1 and a lowered load carrying posture in which the front end side is lowered relative to the vehicle body 1. An engine section 10 having an engine 11 is formed at a portion of the rear portion of the vehicle body 1 and downwardly of the load carrier deck 8.

[Arrangement of Engine Section 10]

Figure 2:
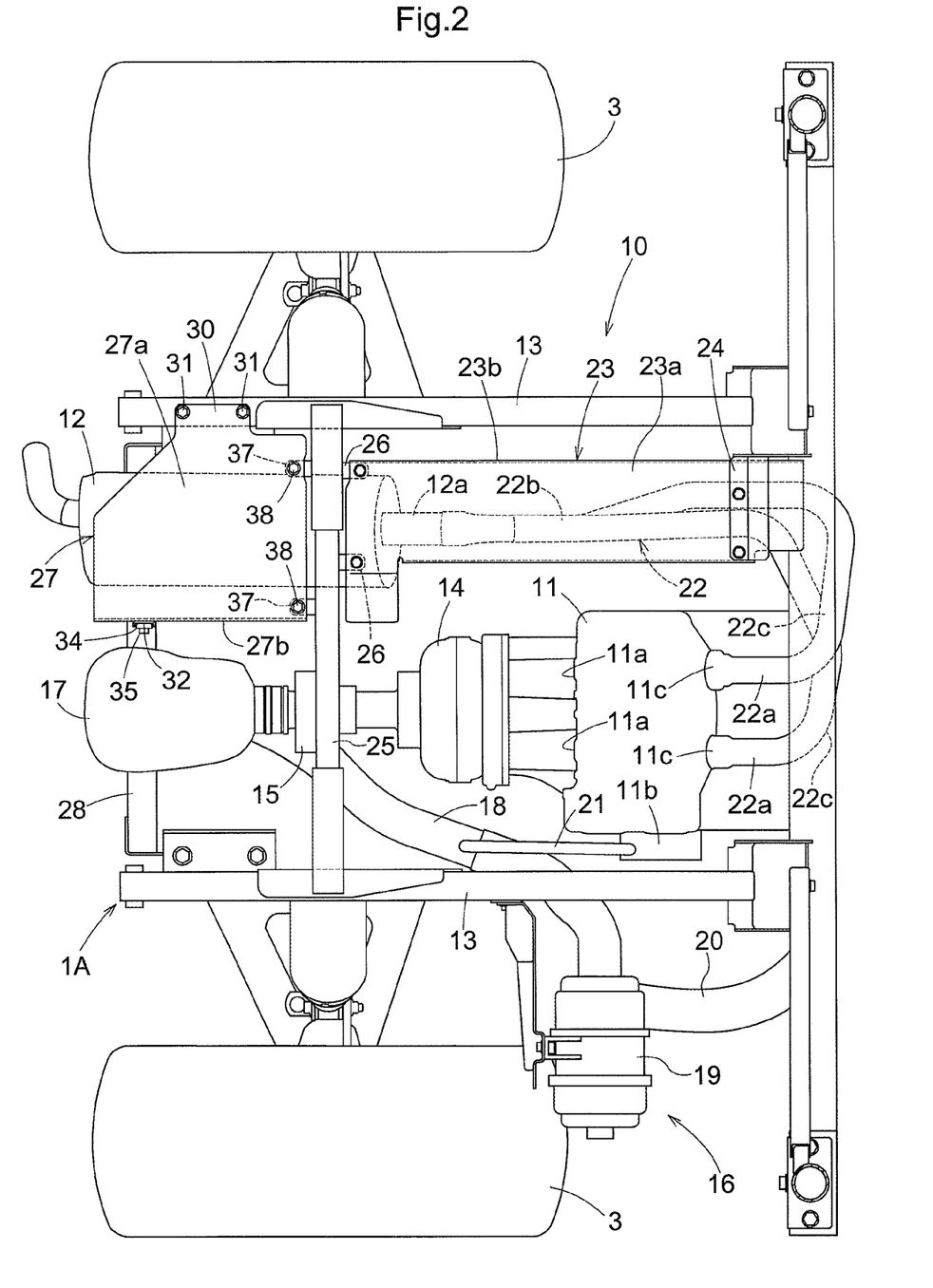
FIG. 2 is a plan view showing an engine section.
Figure 3:
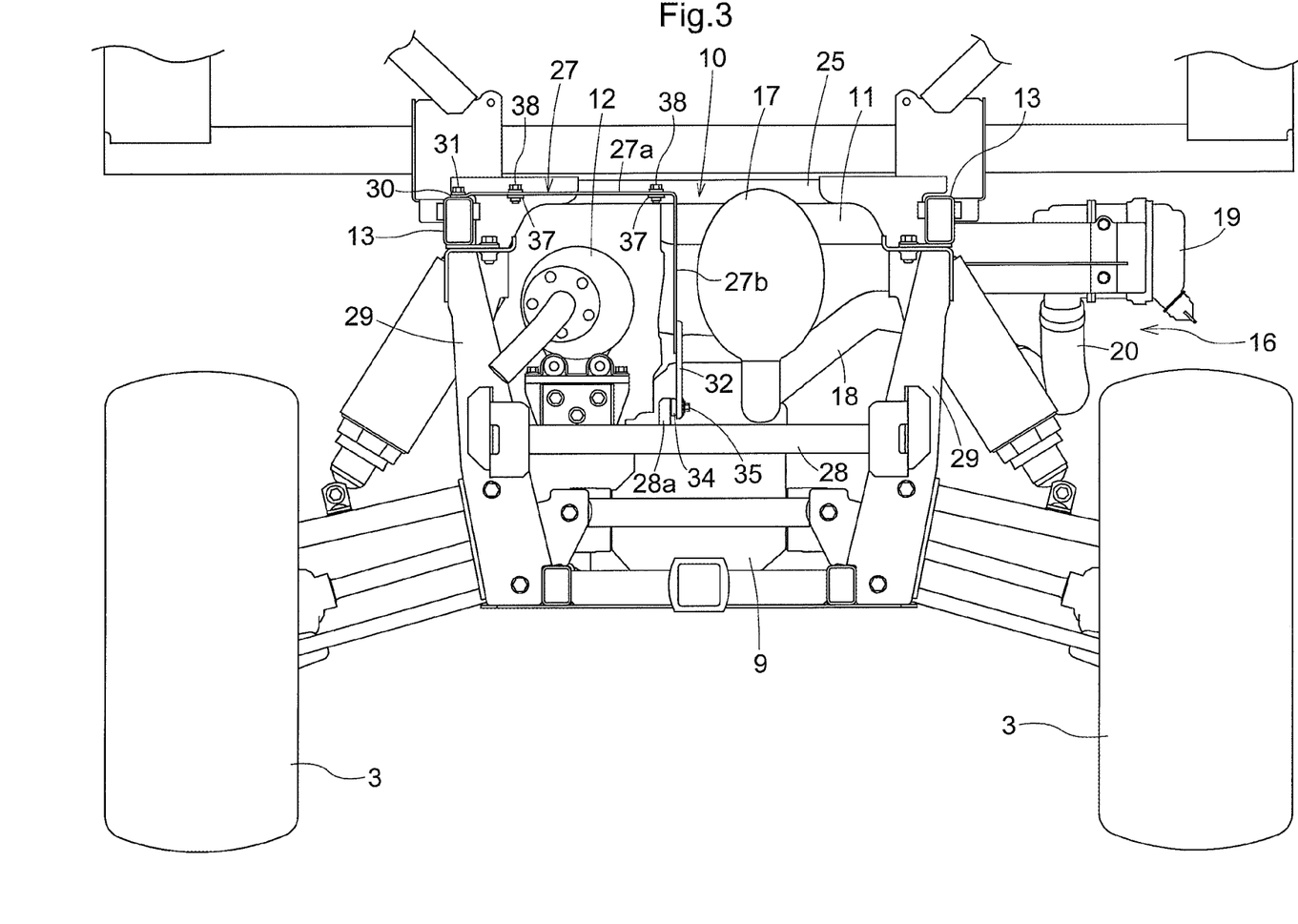
FIG. 3 is a rear view showing the engine section.

As shown in FIGS. 2 and 3, the engine section 10 includes the engine 11, an exhaust muffler 12 for the engine 11, and a traveling transmission 9 which inputs power from the engine 11 and outputs the inputted power to the front wheels 2 and the rear wheels 3.

The engine 11 is mounted between a pair of right and left front/rear oriented vehicle body frames 13 of the vehicle body frame (framework) 1. The right and left front/rear oriented vehicle body frames 13 extend under the load carrier deck 8 along a vehicle body front/rear direction. To an air inlet portion 11a provided at a rear side portion of the upper portion of engine 11, an air inlet passage 16 is connected via a combustion chamber 14 and a throttle valve 15. As shown in FIGS. 2 and 3, the air inlet passage 16 is connected to the throttle valve 15. The air inlet passage 16 is provided with: a resonator 17 for silencing exhaust noise; a downstream side air inlet pipe 18 whose rear end portion is connected to an air inlet portion of the resonator 17; an air cleaner 19 whose outlet portion is connected to a front end portion of the downstream side air inlet pipe 18; and an upstream side air inlet pipe 20 extending forwardly from an air inlet portion of the air cleaner 19. The upstream side air inlet pipe 20 extends to the inner side of the front lid 4. At the leading end of the upstream side air inlet pipe 20, there is formed an air inlet which is opened to the inner space of the front lid 4. A blowby gas return passage 21 is connected to a blowby gas discharge portion 11b formed at a lateral portion of the engine 11 and to the downstream side air inlet pipe 18. In operation, the blowby gas generated in the engine 11 will be returned via the blowby gas return passage 21 to the air inlet passage 16, and then returned via this air inlet passage 16 to the combustion chamber 14 to be combusted in the combustion chamber 14.

As shown in FIG. 2, the exhaust muffler 12 is provided between the pair of right and left front/rear oriented vehicle body frames 13, at a position on more rear side than the engine 11 and closer to the left front/rear oriented vehicle body frame 13 than the right front/rear oriented vehicle body frame 13. The front/rear orientation of the exhaust muffler 12 is in agreement with the front/rear orientation of the vehicle body 1. An air inlet portion 12a provided at a front portion of the exhaust muffler 12 and an exhaust portion 11c provided at a front side portion of the upper portion of the engine 11 are connected and communicated with each other via a connection pipe 22.

[Heat Insulating Arrangement]

As shown in FIG. 2, the connection pipe 22 includes an engine side front/rear oriented portion 22a extending forwardly from the exhaust portion 11c of the engine 11, a muffler side front/rear oriented portion 22b extending forwardly from the air inlet portion 12a of the exhaust muffler 12, and a laterally oriented portion 22c which connects the front end of the muffler side front/rear oriented portion 22b to the front end of the engine side front/rear oriented portion 22a.

A first heat insulating cover 23 (an example of "connection pipe heat insulating cover") covers the muffler side front/rear oriented portion 22b, so that the first heat insulating cover 23 may prevent heat discharge from the connection pipe 22 to the load carrier deck 8, and also prevent upper exposure of the connection pipe 22 when the load carrier deck 8 is elevated to the elevated discharging posture.

Figure 4:
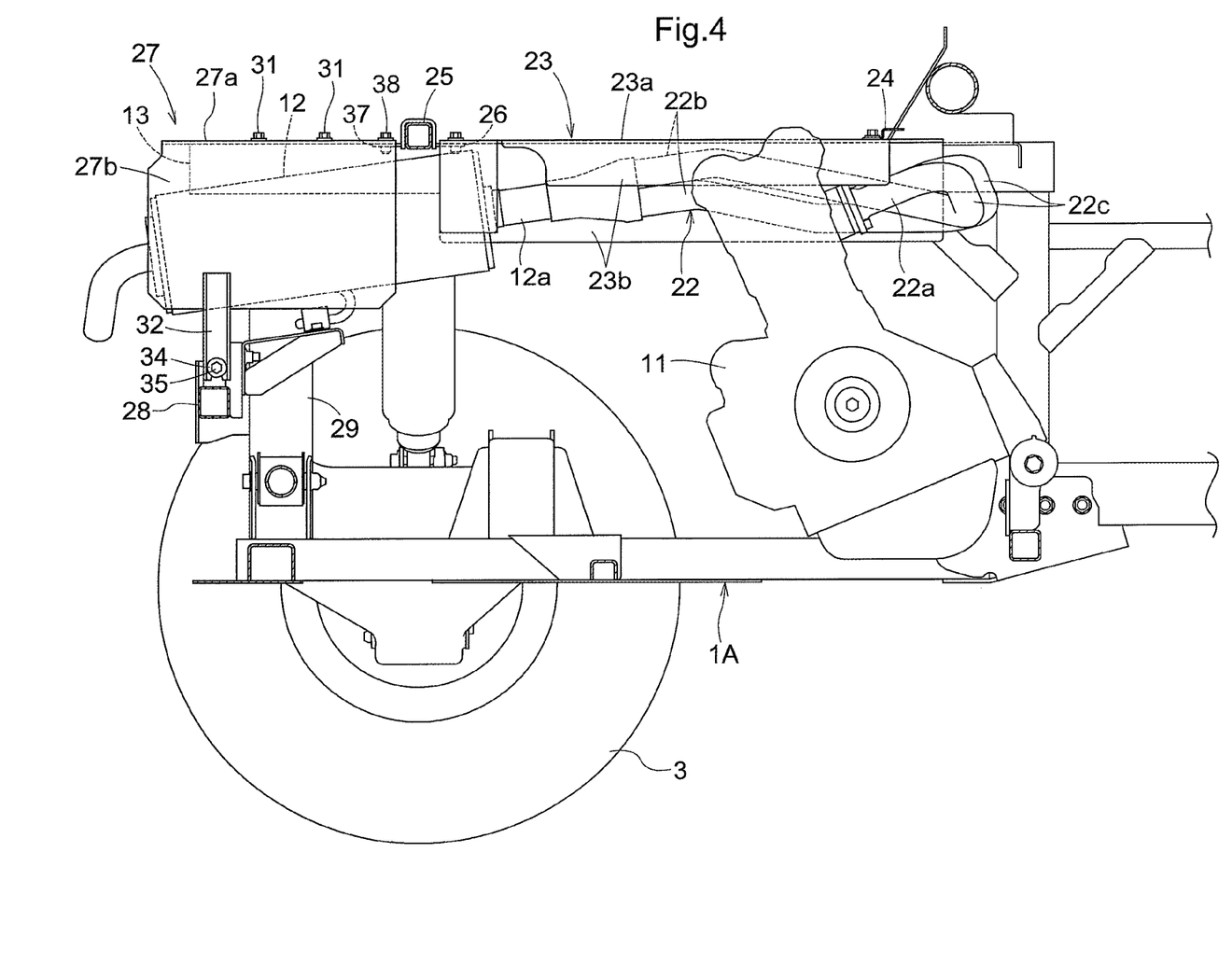
FIG. 4 is a left side view showing a cover arrangement of a connection pipe and an exhaust muffler.
Figure 5:
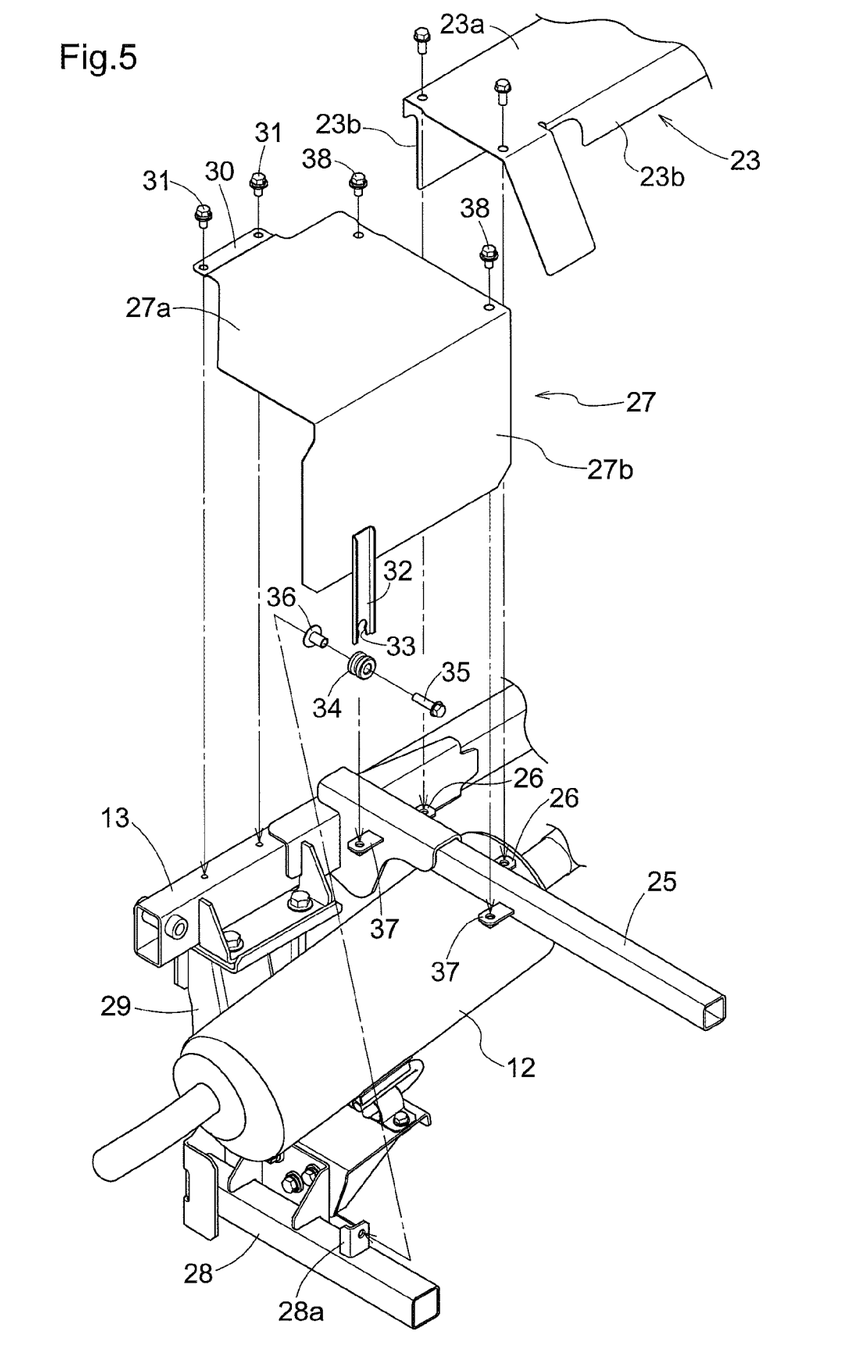
FIG. 5 is a perspective view showing a portion of a first heat insulating cover (connection pipe heat insulating cover) and a second heat insulating cover (muffler heat insulating cover)

More specifically, as shown in FIGS. 2, 4 and 5, the first heat insulating cover 23 includes an upper cover portion 23a disposed upwardly of the muffler side front/rear oriented portion 22b, and right and left lateral cover portions 23b extending downwards from the opposed lateral ends of the upper cover portion 2a. The right and left lateral cover portions 23b are disposed in distribution on the opposed lateral sides of the muffler side front/rear oriented portion 22b. The muffler side front/rear oriented portion 22b of the connection pipe 22 is covered from above by the upper cover portion 23a of the first heat insulating cover 23, and also is covered from the opposed lateral sides by the right and left lateral cover portions 23b of the first heat insulating cover 23.

The front portion of the first heat insulating cover 23 is supported by the left front/rear oriented vehicle body frame 13 via a bracket 24. The front portion of the first heat insulating cover 23 is connected to the bracket 24 via a connecting bolt. The rear portion of the first heat insulting cover 23 is supported by a support member 25 mounted to/between the right and left front/rear oriented vehicle body frames 13. More particularly, the rear portion of the first heat insulating cover 23 is connected via connecting bolts to brackets 26 included in the support member 25.

A second heat insulating cover 27 (an example of "muffler heat insulating cover") covers the exhaust muffler 12 from the outer circumference side thereof, so that the second heat insulating cover 27 may prevent heat discharge from the exhaust muffler 12 to the load carrier deck 8, and also prevent upper exposure of the exhaust muffler 12 when the load carrier deck 8 is elevated to the elevated discharging posture.

More specifically, as shown in FIGS. 2, 3 and 4, the second heat insulating cover 27 includes an upper cover portion 27a which is disposed upwardly of the exhaust muffler 12, and a lateral cover portion 27b which extends downward from the right lateral end of the upper cover portion 27a. The lateral cover portion 27c is disposed on the lateral side of the exhaust muffler 12, and more particularly, on the side opposite the left front/rear oriented vehicle body frame 13 relative to the exhaust muffler 12. The exhaust muffler 12 is covered form the vehicle body left lateral outer side by the left front/rear oriented vehicle body frame 13, and covered from above by the upper cover portion 27a of the second heat insulating cover 27, and also is covered from the vehicle body right lateral side by the lateral cover portion 27b of the second heat insulating cover 27.

As shown in FIGS. 2, 3 and 4, the second heat insulating cover 27 is supported by the left front/rear oriented vehicle body frame 13 of the vehicle body frame 1A, a laterally oriented vehicle body frame 28 of the vehicle body frame 1A, and the support member 25.

As shown in FIGS. 2, 3 and 4, the opposed end sides of the laterally oriented vehicle body frame 28 are supported by respective rear wheel support frames 29 which extend vertically of the vehicle body. An upper portion of the left rear wheel support frame 29 is connected to the left front/rear oriented vehicle body frame 13, and an upper portion of the right rear wheel support frame 29 is connected to the right front/rear oriented vehicle body frame 13. The laterally oriented vehicle body frame 28 interconnects the right and left front/rear oriented vehicle body frames 13 via the right and left rear wheel support frames 29.

More specifically, the supporting arrangement of the second heat insulating cover 27 to the left front/rear oriented vehicle body frame 13 is configured as follows.

As shown in FIG. 5, an attachment portion 30 is disposed at the left end portion of the upper cover portion 27a, which portion corresponds to "one end side" of the second heat insulating cover 27. As shown in FIGS. 2 and 3, the attachment portion 30 of the upper cover portion 27a is connected to the left front/rear oriented vehicle body frame 13 via connecting bolts 31.

Figure 6:
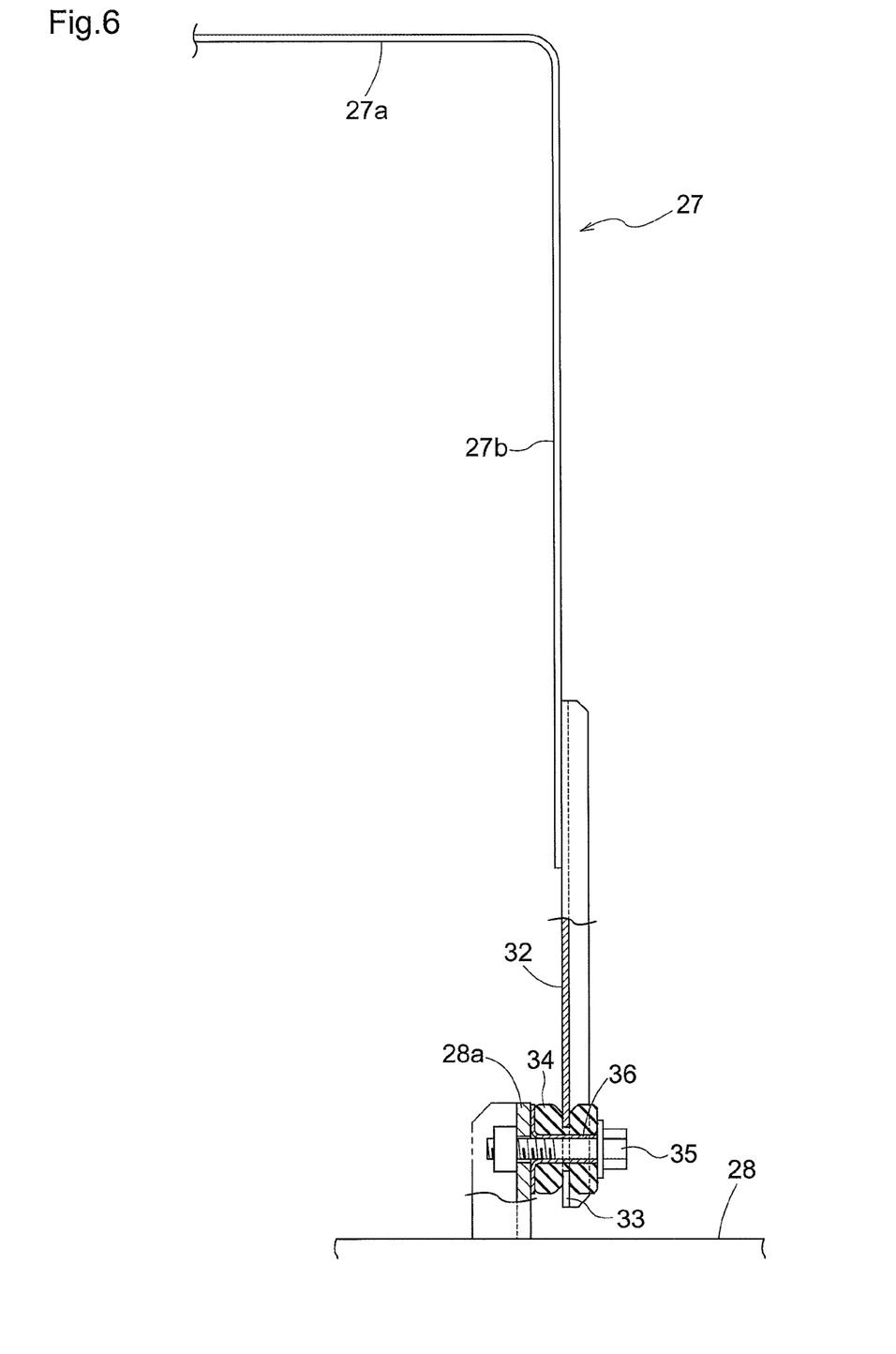
FIG. 6 is a section view showing a supporting arrangement for the second heat insulating cover.

Supporting the second heat insulating cover 27 to the laterally oriented vehicle body frame 28 is effected via an anti-vibration member 34, as shown in FIGS. 3 and 6.

Specifically, as shown in FIG. 5, an attachment arm 32 (an example of "arm member") extends downwards from the lower portion of the laterally oriented cover portion 27b, which portion corresponds to "the other end side" of the second heat insulating cover 27. A cutout portion 33 is formed at an extension end portion of the attachment arm 32. The laterally oriented vehicle body frame 28 includes a support portion 28a which protrudes upward from the laterally oriented vehicle body frame 28. As shown in FIG. 6, the extension end portion of the attachment arm 32 and the anti-vibration member 34, having its intermediate portion fitted within the cutout portion 32 of the attachment arm 32, are fastened and connected together to the support portion 28a via a connecting bolt 35 inserted through an attachment hole of the anti-vibration member 34. In the attachment hole of the anti-vibration member 34, a fastening restriction member 36 is fitted. When the connecting bolt 35 is fastened progressively, the fastening restriction member 36 will be clamped by and between the support portion 28a and the head of the fastening bolt 35, thus providing a stopping action on the connecting bolt 35. Whereby, the fastening restriction member 36 provides its restricting action so that the fastening stroke of the connecting bolt 35 will not exceed a set value, thus preventing excessive fastening to impair the elasticity (shock absorbing function) of the anti-vibration member 34.

As shown in FIGS. 2, 3 and 4, supporting the second heat insulating cover 27 by the support member 25 is done by connecting the front end portion of the upper cover portion 27a to a bracket 37 (see FIG. 5), which is provided on the support member 25, via connecting bolts 38.

[Other Embodiments]

(1) In the foregoing embodiment, no anti-vibration member is employed for supporting the second heat insulating cover 27 by the front/rear oriented vehicle body frame 13. However, such anti-vibration member may be employed therein.

(2) In the foregoing embodiment, the laterally oriented vehicle body frame 28 of the vehicle body frame 1A is employed for supporting the second heat insulating cover 27 by the vehicle body frame 1A via the anti-vibration member 34. The invention is not limited thereto. Depending on the attachment posture of the exhaust muffler 12, any portion of any frame element of the vehicle body frame 1A may be employed for the purpose.

(3) In the foregoing embodiment, in the exhaust muffler heat insulating cover 27, the lateral cover portion 27b is provided only on one lateral side of the upper cover portion 27a. Instead, the heat insulating cover may be embodied with provision of lateral cover portion on both lateral sides.

(4) In the foregoing embodiment, the work vehicle is embodied as a utility vehicle. The work vehicle may be employed as other work vehicle such as a transporter vehicle, a tractor, a combine, etc.

What is claimed is:

1. A work vehicle comprising:
   a vehicle body having a vehicle body frame;
   a load carrier deck provided at a rear portion of the vehicle body, the load carrier deck being vertically pivotable between an elevated discharging posture and a lowered load carrying posture;
   an engine section provided under the load carrier deck, the engine section including an engine and an exhaust muffler for the engine;
   a muffler heat insulating cover that covers at least a portion of an outer circumference of the exhaust muffler; and
   an elastic anti-vibration member provided in a region of the muffler heat insulating cover adjacent the vehicle body frame, the muffler heat insluting cover being supported by the vehicle body frame via the elastic anti-vibration member,
   wherein the elastic anti-vibration member is connectable to the vehicle body frame by a connecting bolt and a fastening restriction member configured for restricting a fastening stroke of the connecting bolt,
   wherein the connecting bolt is disposed through an attachment hole in the elastic anti-vibration member to fasten the elastic anti-vibration member to a support portion of the vehicle body frame, and wherein the fastening restriction member is disposed through the attachment hole and clamped by and between the support portion and a head of the connecting bolt while being fitted around the connecting bolt.

2. The work vehicle as defined in claim 1, wherein:

the vehicle body frame includes a pair of right and left front/rear oriented vehicle body frames extending in a front/rear direction of the vehicle body;

the exhaust muffler is provided on more of a vehicle body inner side than the front/rear oriented vehicle body frames; and the muffler heat insulating cover includes:
  an upper cover portion that covers the exhaust muffler from above, and
  a lateral cover portion that covers the exhaust muffler from the side opposite the front/rear oriented vehicle body frames relative to the exhaust muffler.

3. The work vehicle as defined in claim 1, wherein:

the vehicle body frame includes a pair of right and left front/rear oriented vehicle body frames extending in a front/rear direction of the vehicle body, and a laterally oriented vehicle body frame that interconnects the pair of right and left front/rear oriented vehicle body frames;

one end side of the muffler heat insulating cover is supported by one of the front/rear oriented vehicle body frames associated therewith; and the other end side of the muffler heat insulating cover is supported by the laterally oriented vehicle body frame via the elastic anti-vibration member.

4. The work vehicle as defined in claim 1, wherein:

an arm member extends from the muffler heat insulating cover to the vehicle body frame; and as the elastic anti-vibration member is engaged with the arm member, the arm member and the elastic anti-vibration member are fastened and connected to the vehicle body frame together.

5. The work vehicle as defined in claim 1, further comprising:

a connection pipe that interconnecting an exhaust section of the engine and the muffler; and a connection pipe heat insulating cover disposed aside the muffler heat insulating member for covering an outer circumference of the connection pipe.

6. A work vehicle comprising:

a vehicle body having a vehicle body frame;

a load carrier deck provided at a rear portion of the vehicle body, the load carrier deck being vertically pivotable between an elevated discharging posture and a lowered load carrying posture;

an engine section provided under the load carrier deck, the engine section including an engine and an exhaust muffler for the engine;

a muffler heat insulating cover that covers at least a portion of an outer circumference of the exhaust muffler, a portion of the muffler heat insulating cover extending from a height of an upper end of the exhaust muffler or higher to a height of a lower end portion of the exhaust muffler, and covering a lateral side of the exhaust muffler; and an elastic anti-vibration member provided in a region of the muffler heat insulating cover adjacent the vehicle body frame, the muffler heat insulting cover being supported by the vehicle body frame via the elastic anti-vibration member, wherein the elastic anti-vibration member is connectable to the vehicle body frame by a connecting bolt and a fastening restriction member configured for restricting a fastening stroke of the connecting bolt, wherein the connecting bolt is disposed through an attachment hole in the elastic anti-vibration member to fasten the elastic anti-vibration member to a support portion of the vehicle body frame, and wherein the fastening restriction member is disposed through the attachment hole and clamped by and between the support portion and a head of the connecting bolt while being fitted around the connecting bolt.

7. The work vehicle as defined in claim 6, wherein:

the vehicle body frame includes a pair of right and left front/rear oriented vehicle body frames extending in a front/rear direction of the vehicle body;

the exhaust muffler is provided on more of a vehicle body inner side than the front/rear oriented vehicle body frames; and the muffler heat insulating cover includes:
  an upper cover portion that covers the exhaust muffler from above, and
  a lateral cover portion that covers the exhaust muffler from the side opposite the front/rear oriented vehicle body frames relative to the exhaust muffler.

8. The work vehicle as defined in claim 6, wherein:

the vehicle body frame includes a pair of right and left front/rear oriented vehicle body frames extending in a front/rear direction of the vehicle body, and a laterally oriented vehicle body frame that interconnects the pair of right and left front/rear oriented vehicle body frames;

one end side of the muffler heat insulating cover is supported by one of the front/rear oriented vehicle body frames associated therewith; and the other end side of the muffler heat insulating cover is supported by the laterally oriented vehicle body frame via the elastic anti-vibration member.

9. The work vehicle as defined in claim 6, wherein:

an arm member extends from the muffler heat insulating cover to the vehicle body frame; and as the elastic anti-vibration member is engaged with the arm member, the arm member and the elastic anti-vibration member are fastened and connected to the vehicle body frame together.

10. The work vehicle as defined in claim 6, further comprising:

a connection pipe that interconnecting an exhaust section of the engine and the muffler; and a connection pipe heat insulating cover disposed aside the muffler heat insulating member for covering an outer circumference of the connection pipe.

\* \* \* \* \*